United States Patent [19]

Blemberg et al.

[11] Patent Number: 5,108,844
[45] Date of Patent: Apr. 28, 1992

[54] BLENDED FILMS, STRUCTURES THEREFROM, AND METHODS OF MAKING AND USING THEM

[75] Inventors: Robert J. Blemberg, Appleton; John P. Eckstein, Neenah; Mark E. Nordness, Appleton, all of Wis.

[73] Assignee: American National Can Company, Chicago, Ill.

[21] Appl. No.: 458,484

[22] Filed: Dec. 28, 1989

[51] Int. Cl.⁵ .................. B32B 27/08; B29C 47/00
[52] U.S. Cl. .................... 428/518; 264/171; 428/520
[58] Field of Search ............ 428/518, 520; 264/171

[56] References Cited

U.S. PATENT DOCUMENTS

| | | | |
|---|---|---|---|
| 3,477,099 | 11/1969 | Lee et al. .................. | 18/13 |
| 3,558,330 | 1/1971 | Widiger et al. .................. | 99/174 |
| 4,379,117 | 4/1983 | Baird, Jr. et al. .................. | 428/518 |
| 4,564,559 | 1/1986 | Wagner, Jr. et al. .................. | 428/518 |
| 4,714,638 | 12/1987 | Lustig et al. .................. | 428/518 |
| 4,755,402 | 7/1988 | Oberle .................. | 428/518 |
| 4,804,510 | 2/1989 | Luecke et al. .................. | 264/169 |
| 4,842,791 | 6/1989 | Gould et al. .................. | 264/171 |
| 4,909,881 | 3/1990 | Garland .................. | 428/518 |
| 4,946,743 | 8/1990 | Winter .................. | 428/480 |

Primary Examiner—James J. Seidleck
Attorney, Agent, or Firm—Robert A. Stenzel

[57] ABSTRACT

Blends having improved adhesion to each other when coextruded into multilayer films, such films, film-packages such as pouches from such films, and methods for making and using the films and film-packages are disclosed and claimed. Improved adhesion between layers results from adjusting the components of the blends of the layers. In addition, improved adhesion between layers results from reducing the temperature of the chill roll in the cast coextrusion process.

6 Claims, 1 Drawing Sheet

BLENDED FILMS, STRUCTURES THEREFROM, AND METHODS OF MAKING AND USING THEM

This invention relates to polymeric barrier materials, particularly coextruded film layers; said layers having improved adhesion to each other.

BACKGROUND OF THE INVENTION

In the manufacture of cast multilayer films, it is desirable that the film layers adhere to each other. If the film layers adhere to each other, the need for a tie or an adhesive layer between the film layers is reduced; and thus, the multilayer film is more economical to produce. Further, if the layers of a multilayer film adhere more strongly to each other, the film is of a superior quality as it is stronger and the separate layers are less subject to peeling apart or delamination. Such a peeling apart or delamination particularly occurs after films or products therefrom are subjected to retorting or like conditions.

In the manufacture of multilayer films or coextrudates, the molten multilayer film exits an extruder and passes over at least one chill roll. In this process, it is believed that the higher the temperature of the chill roll, the better the adhesion between the layers of product. Even with this conventional wisdom, it is difficult to bond polyolefins to vinylidene chloride copolymers, polyesters, polyamides and/or polycarbonates.

It is believed that heretofore, it has not been proposed to decrease the chill roll temperature to obtain better adhesion between the layers of multilayer films.

It is therefore an object of this invention to provide blends from which film layers can be coextruded to form multilayer products It is a further object of this invention that said film layers have better adhesion to each other. It is also an object of this invention to provide a coextrusion process which produces films with layers which have better adhesion to each other.

In addition, it is an object of this invention to provide multilayer films which have better adhesion to each other and which maintain this desirable quality even after the rigors of retorting or like conditions.

SUMMARY OF THE INVENTION

It has now been surprisingly discovered that film layers which do not usually adhere well to each other can be made to do so by adding to each of the separate layers a selected amount of at least one of the components of the other layer. The present invention therefore comprises multilayer films or laminates from such layers, the blends comprising such layers, and structures from such multilayer films, as well as methods of packaging and preparing foods using such structures.

It has also been surprisingly discovered that better adhesion between film layers is obtained by reducing, rather than increasing, the temperature of the chill roll in the coextrusion process for manufacturing multilayer films. The present invention therefore comprises a method for manufacturing a multilayer film having improved adhesion between the layers thereof comprising coextruding the components of said multilayer film and passing the coextrudate over at least one chill roll having a reduced temperature. The present invention also comprises using this method with the blends of this invention to form films.

DETAILED DESCRIPTION

Figure 1:
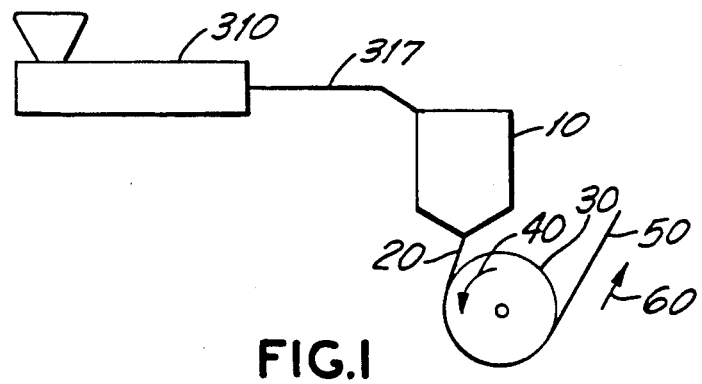
FIG. 1 illustrates one apparatus for producing films in accordance with the invention.

In the practice of the present invention, if a first layer comprises film forming polymer or copolymer X and a second layer comprises film forming polymer or copolymer Y, these layers can have improved adhesion to each other when formed into a multilayer film by coextrusion if the first layer comprises 70 to 90% by weight of X and 30 to 10% by weight of Y (rather than 100% of X) and the second layer comprises 70 to 90% by weight Y and 30 to 10% by weight of X (rather than 100% of Y). As an alternative, if layers X and Y are to be adhered together, at least one adhesive or tie, T, can be used; and, tie T can be comprised of a blend of some or all of the components of X and/or some or all of the components of Y. This invention also resides in multilayer films comprising a plurality of coextruded layers wherein there is at least two adjacent layers, a first and a second layer and said first layer comprises a blend of some or all of the components of the second layer and the second layer comprises a blend of some or all of the components of the first layer.

While the problem overcome by this invention concerns improving the adhesion of polyolefins, vinylidene chloride copolymers, polyesters, polyamides and/or polycarbonates, as generically described above, X and Y can be any material suitable for making film layers therefrom. Such materials, by way of example, include generally polyolefins, polyesters, polyamides, and polycarbonates, and, more specifically, polyvinylidene chloride-based copolymers such as vinylidene chloride vinyl chloride copolymers, and vinylidene chloride methyl acrylate copolymers, e.g., MA Saran (Dow Saran MA 119, Dow Chemical Co.) which can also contain other stabilizers, plasticizers or lubricants, polyethylene (PE), medium density polyethylene (MDPE), high density polyethylene (HDPE), low density polyethylene (LDPE), White LDPE, linear low density polyethylene (LLDPE), very low density polyethylene (VLDPE), polypropylene (PP), propylene ethylene copolymer (PPE), nylon, ethylene vinyl acetate (EVA), high VA content EVA (e.g. 28–35% by weight VA content EVA), ethylene methyl acrylate copolymer (EMA), high impact polystyrene (HIPS), polyvinyl chloride (PVC), ethylene butene copolymer (EB), maleic anhydride modified polyolefins (wherein "polyolefins" includes EVA), polyethylene terephthalate (PET), copolymers of PET or CoPET, or an ionomer, e.g., SURLYN (Du Pont), or the like, or mixtures thereof. As to nylon, nylon 6; 11; 12; 6, 12 and 6, 66 are suitable as are commercially available products such as ULTRAMIDKR 4600 (BASF), NOVAMID 2030 (Mitsubishi Chem. Co.) DURATHANE (Farbenfabriken Bayer, A. G.), "1030" (Unitika, Japan), ZYTEL SUPERTUFF 811 (Du Pont), "4018" (Huels, Germany), and ELY 1256 (Elmser, Switzerland). Other suitable commercially available materials include Exxon 5610 (blend of PP containing EVA), Admer (Mitsui, No. AT469C), Bynel (Du Pont, E361 or 3036), Plexar 3342. Admer, Bynel and Plexar 3342 are believed to be maleic anhydride modified polyolefins.

Some mixtures of film forming polymers or copolymers according to this invention will be better suited to certain particular end uses than others, e.g., some mixtures may be less miscible than others, or will exhibit different properties than the individual components of the mixtures. For instance, some mixes of PP and MA Saran may produce films having barrier properties which are less than those of PP or MA Saran individually; but, such a mixture is nevertheless useful for certain applications. Further, ethylene vinyl acetate (EVA) can be added to vinylidene chloride copolymers and vinylidene chloride copolymers can likewise be added to tie layers to improve adhesion. However, with respect to polyvinylidene chloride methyl acrylate copolymers, it has been found that when blended with EVA, the resultant films are useful; but, they suffer from reduced barrier properties, to which reference is made to commonly owned and concurrently filed application Ser. No. 07/458,483, which is hereby incorporated herein by reference. As to blending vinylidene chloride copolymers' into tie layers, e.g., layers comprising mostly EVA, there is the possibility of degradation of the vinylidene chloride copolymers in such a blend. However, for improved adhesion between layers, EVA is suitable to blend with vinylidene chloride copolymers and vinylidene chloride copolymers are suitable to blend with tie layers such as EVA.

To illustrate the present invention: for bonding film layers of PP to a film layer of vinylidene chloride methyl acrylate copolymer (MA Saran), the following coextrusion structure of this invention can be employed: PP/Tie layer/MA Saran wherein the Tie layer comprises 20 to 30% by weight PP and 70 to 80% by weight EVA or EMA or Exxon 5610. Likewise, to bond a film layer of polyester and a film layer of polyolefin, the following coextrusion structures of this invention can be employed: Polyester/ T1/T2/T3/Polyolefin; or Polyester/T1/T3/Polyolefin; or Polyester/T4/Polyolefin; wherein T1 comprises 10 to 20% by weight Admer and 90 to 80% by weight polyester, T2 comprises Admer, T3 comprises 10 to 20% by weight polyolefin and 90 to 80% by weight Admer, and T4 comprises 10 to 20% by weight polyester, 10 to 20% by weight polyolefin and 80 to 60% by weight Admer. Bynel or Plexar 3342 or a high VA EVA (e.g., 28-35% by weight VA content EVA) can be substituted for the Admer.

Similar coextrusion structures of this invention can be used to join polycarbonates to polyolefins and to join polyamides (e.g., nylon) to polyolefins. The following coextrusion structures are provided to illustrate these embodiments: Polycarbonate/T5/T2/T3/Polyolefin, Polycarbonate/T5/T3/Polyolefin, Polycarbonate/T6/Polyolefin, Polyamide/T7/T2/T3/Polyolefin, Polyamide/T7/T3/Polyolefin, Polyamide/T8/Polyolefin; wherein, T5 comprises 10 to 20% by weight Admer and 90 to 80% by weight polycarbonate, T2 and T3 are as defined above, T6 comprises 10 to 20% by weight polycarbonate, 10 to 20% by weight polyolefin and 80 to 60% by weight Admer, T7 comprises 10 to 20% by weight Admer and 90 to 80% by weight polyamide, and T8 comprises 10 to 20% by weight polyamide, 10 to 20% by weight polyolefin and 80 to 60% by weight Admer. Again, Bynel, Plexar 3342 or a high VA EVA can be substituted for the Admer.

While the preceding text as well as elsewhere herein speaks in terms of "coextrusion" it should be understood that this invention is applicable to any extrusion processes for forming multilayer films, including, by way of example, extrusion, blown extrusion, tubular water quench extrusion, extrusion coating, blown coextrusion, and the like, and combinations thereof.

Additional layers of any suitable material, such as those listed above, may be extruded (e.g., coextrusion blown or tubular water quench extrusion or extrusion coating, etc. and the like and combinations thereof) or even laminated onto the multilayer film coextrudate structures of the present invention. For instance PET/TIE/coextrudate of present invention/TIE/PET. Any suitable material can be used as a tie or adhesive. Such materials, by way of example, include EVA-based polymers, anhydride modified olefins or polyolefins, copolymer compositions, or other synthetic resinous materials Presently, maleic anhydride modified oleofins or polyolefins are preferred tie materials.

Films of this invention include the multilayer film coextrudate structures of this invention, either with or without additional layers. Films of this invention can be formed into packages such as pouches or lid stock; such films and packages are included within the term "film-package" as used herein. If desired, e.g., for a particular end use, the films may be oriented by conventional processes such as blown tubular orientation, stretch orientation, or molecular orientation. They may also be cross-linked by conventional processes such as by irradiation, heat, or the addition of cross-linking agents.

Films of this invention are the same thickness as conventional films, i.e. about 2.0 mils (0.051 mm) with a normal range of about 1.5 to about 3.0 mils (0.038-0.076 mm). Films thinner than about 1.5 mils (0.038 mm) tend to be too weak to perform their required functions (although individual layers of multilayer structures may be thinner than about 1.5 mils). Films thicker than about 3.0 mils (0.076 mm) are economically less competitive, although films up to about 20 mils (0.51 mm) are functional.

Films of this invention, can be formed into a finished package or "film-package", such as a pouch, by conventional methods. e.g., by forming heat or adhesive seals about the periphery of the shape to be formed into a pouch. For instance, if a square pouch such as a retort pouch is desired, a rectangular film twice the desired length of the pouch is folded, the two parallel sides of the periphery (perpendicular to the fold) heat or adhesive sealed, the food or other material to be packaged inserted therein, and then the remaining open side of the periphery is heat or adhesive sealed. Another method for making a typical retort pouch is by sealing on three sides face-to-face films, filling the thus formed open pouch with food or whatever material is to be packaged therein, and then sealing the fourth side. Another type of film-package is lid stock for trays, such as microwaveable trays: the lid stock is pulled over the tray.

For background on pouches and their production, reference is made to U.S. Pat. Nos. 4,190,477, 4,311,742, 4,360,550, and 4,424,256, each of which being hereby incorporated herein by reference.

Retort pouches and microwaveable trays are usually filled with food, although the contents of the package is not a limitation of the invention. In fact, retort pouches can also be filled with medical supplies, blood and other materials. The packages of the invention are, however, especially useful as retort pouches and microwaveable trays containing food. Sealed retort pouches and microwaveable trays containing food or other materials are usually heated or retorted at temperatures and times sufficient to achieve commercial sterilization as defined in Title 21, C.F.R., Part 113 (Definitions, Sec. 113.3) which states that, "Commercial sterility of thermally processed food means the condition achieved—
"(i) By the application of heat which renders the food free of—
"(a) Microorganisms capable of reproducing in the food under normal nonrefrigerated conditions of storage and distribution; and
"(b) Viable microorganisms (including spores) or public health significance; or
"(ii) By the control of water activity and the application of heat which render the food free of microorganisms capable of reproducing in the food under normal nonrefrigerated conditions of storage and distribution."

In general, to kill microorganisms such as bacteria in food or other materials, the temperature of heating and time thereof must be sufficient so that the food or other materials achieves a temperature of at least 140° F. The cooking of food and the killing of microorganisms in food or other materials can be achieved by heating or retorting the pouch or tray containing food or other materials at a temperature typically from about 212° to 275° F. for a sufficient time, e.g., at 265° F. Typical retort times are form ½ hour to an hour, although usually less than one hour. The time and temperature of retorting depends upon the contents and the amount thereof in the pouch or tray. The said heating can be achieved by heated or boiling water, steam or heated or pressurized steam; the heated water can achieve temperatures greater than 212° F., without boiling by adjusting the pressure accordingly. This heating can also be achieved by microwaveable pasturization.

Furthermore, with respect to film-packages it is noted that with respect to prior art film structures, the post retort deterioration was especially noticed with respect to lid stock for microwaveable trays. As a result of retorting conditions, when problem (i.e., prior art) lid stock is attempted to be pulled off of the tray, the layers thereof separate due to deterioration. With pouches, this separation problem is generally not noticed because pouches are generally cut open to empty their contents. However, the present invention overcomes the problem of post-retort adhesion deterioration by providing improved adhesion between layers. In this regard, it is noted that of the above-described structures of this invention, those having a single tie layer may be used in pouches because pouches are generally cut open to empty their contents; and, those structures having two or more tie layers may be useful for lid stock because the lid must be pulled over and off of the tray. However, pouches may have two or more tie layers and lid stock may have only a single tie layer. The structures having two or more tie layers are best suited for lid stock because they exhibit superior adhesion, especially post-retort adhesion, and are thus well-suited for lid stock.

Films and film packages of the present invention are also useful in Modified Atmosphere Packaging wherein food or other materials are packaged under a nitrogen atmosphere.

Turning to the process aspects of this invention, FIG. 1 depicts an apparatus for producing films. In FIG. 1, the components of the film (not shown) are put into extruder 310. From extruder 310 the extrudate flows through conduit 317 to die 10. From die 10 emerges molten film 20 which passes onto chill roll 30 which is rotating in the direction of arrow 40. Film 50 comes off chill roll 30 in the direction of arrow 60. Other apparatus for producing films as well as other films are known; and, for background on such, reference is made to U.S. Pat. Nos. 3,477,099, 4,755,402, 3,558,330, 4,714,638, 4,842,791, 4,379,117, and 4,804,510, each of which being hereby incorporated herein by reference. Particularly useful methods for coextruding multilayer film coextrudate structures of this invention which can be improved by the process improvements herein (e.g., reduced chill roll temperature), are described and claimed in the commonly owned and co-pending U.S. patent applications, Ser. Nos. 07/458,487, 07/458,488, 07/458,485, 07/458,486, 07/458,409, each of which was filed on Dec. 28, 1989, and, 07/204,485, filed June 9, 1988, now abandoned, each of which being incorporated herein by reference.

Figure 2:
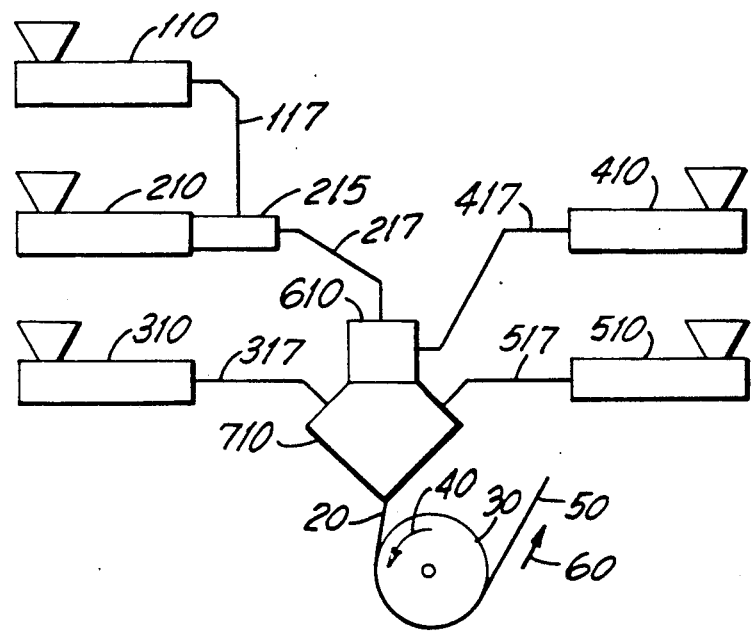
FIG. 2 is a depiction of an apparatus for producing multilayer films.
Figure 3:
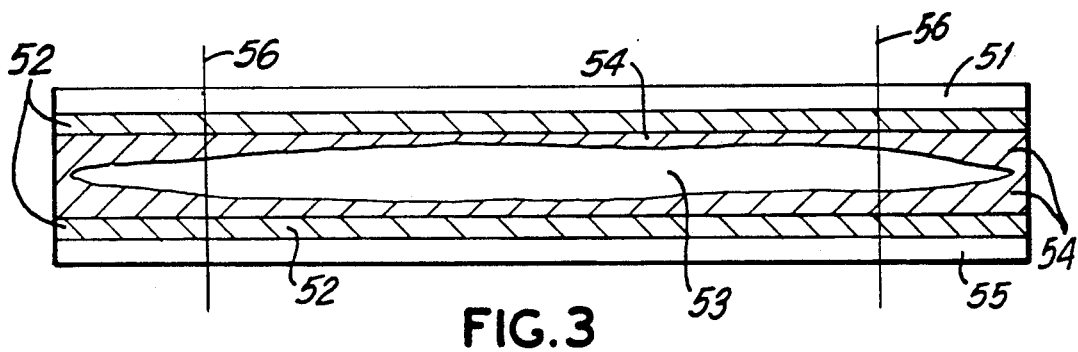
FIG. 3 is a cross-section of a multilayer film such as might be produced utilizing the apparatus shown in FIG. 2.

FIG. 2 is a more elaborate depiction of an apparatus for producing multilayer films FIG. 3 is a cross-section of a multilayer film such as made from the apparatus shown in FIG. 2. With reference to both FIGS. 2 and 3, the components for layers 54 are fed into extruder 110, the components for layer 53 are fed into extruder 210, the components for layer 51 are fed into extruder 310, the components for layers 52 are fed into extruder 410, and the components for layer 55 are fed into extruder 510. The extrudate from extruder 110 flows through conduit 117 to encapsulator 215. The extrudate from extruder 210 also flows to encapsulator 215. At encapsulator 215, the extruded components for layer 53 are encapsulated within the extruded components for layers 54. The encapsulated product flows through conduit 217 to feed block 610. The extrudate from extruder 410 flows through conduit 417 to feed block 610. The extrudate from extruder 310 flows through conduit 317 to die 710. The extrudate from extruder 510 flows through conduit 517 to die 710. The encapsulated product and the extrudate from extruder 410, after having flowed to feed block 610 by their respective conduits, flow from feed block 610 to die 710. Emerging from die 710 is molten multilayer film 20 which passes onto chill roll 30 which is rotating in the direction of arrow 40. Film 50 comes off chill roll 30 in the direction of arrow 60. Film 50 is trimmed at edges 56. For films of two layers, only extruders 310 and 510 need be utilized; for films of three layers only extruders 310, 410 and 510 need be utilized; and, for films of four layers or more, the skilled artisan can accordingly adjust the apparatus depicted in FIG. 2.

As seen in FIGS. 1 and 2, in the manufacture of multilayer film coextrudate structures, the molten multilayer film 20 comes out of either die 10 or die 710 and passes over at least one chill roll 30. The conventional wisdom is that the chill roll 30 be below the thermoplastic temperature of the molten multilayer film, typically a temperature about 110°-120° F., and that to increase adhesion between layers, the temperature of the chill roll should be increased as high as possible without imparting visual defects to the film or causing the film to stick to the chill roll.

However, it has now been surprisingly found that greater adhesion is achieved when the temperature of the chill roll is lowered, rather than raised, from the thermoplastic temperature. That is, as chill roll temperature decreases, adhesion increases. Generally, for better adhesion, the temperature of the chill roll should be as cold as possible preferably below 70° F. and even less than 40° F. It is noted that the decrease in chill roll temperature is dependent on the components of the film extruded.

However, decreased chill roll temperature, below about 60° F. may cause condensation which forms undesirable marks on the resultant film At temperatures between below 40° to 60° F., it is best to monitor the humidity under which the film is being produced because at these temperatures with a sufficiently high humidity, condensation may occur. Again, given that the chill roll has been heretofore typically 110°-120° F., as an upper limit for the decreased chill roll temperature, about 100° F. is stated because higher chill roll temperatures do not yield a significant increase in adhesion from the typical 110° F. Presently, the preferred chill roll temperature is below about 70° F.

It is further noted that the decreased chill roll temperature taught herein is especially suitable for vinylidene chloride copolymer/EVA films, e.g. films of layers vinylidene chloride-methyl acrylate copolymers/EVA, and for films comprising the structure PP/Tie, e.g., PP/Tie/MA Saran, wherein the tie can be EVA, or a blend of PP and EVA or EMA.

To illustrate the improvement from the process aspect of this invention: a multilayer film coextrudate structure LLDPE/EVA/MA Saran/EVA/LLDPE formed from an apparatus having a chill roll temperature of 160° is able to be peeled apart or delaminated; but, when formed at a chill roll temperature of about 60° F.-70° F. the layers thereof cannot be separated.

The following non-limiting examples are given by way of further illustration only and are not to be considered limitations of this invention, many apparent variations of which are possible without departing from the spirit or scope thereof.

EXAMPLES

Example 1

A multilayer film coextrudate structure of this invention having five (5) layers was formed of a first layer of PP (Fina 3622), a second layer (tie) of a PP blend containing EVA (Exxon 5610A-2; 30% EVA), a third layer of a vinylidene chloride methyl acrylate copolymer (MA Saran), and a fourth (tie) and fifth layers being the same as the second and first layers, respectively. This structure can be represented as: Fina 3622/Exxon 4610A-2/MA Saran/Exxon 5610A-2/Fina 3622. The structure was tested for adhesion between the polypropylene and the tie layers after four (4) weeks aging and after retorting at 265° F. for one hour. The results are provided in Table 1.

Example 2

A multilayer film coextrudate structure of this invention having five (5) layers was formed of a first layer of 90% by weight PP (Fina 3622) and 10% by weight EVA (Exxon LD-761; 28% by weight VA), a second layer (tie) of a PP blend containing EVA (Exxon 5610A-2), a third layer of a vinylidene chloride methyl acrylate copolymer (MA Saran), and a fourth (tie) and fifth layers being the same as the second and first layers, respectively. This structure can be represented as: 90% Fina 3622, 10% LD-761/Exxon 5610A-2/MA Saran/Exxon 5610A-2/90% Fina 3622, 10% LD-761. The structure was tested for adhesion between the polypropylene and the tie layers after four (4) weeks aging and after retorting at 265° F. for one hour. The results are provided in Table 1.

Example 3

A multilayer film coextrudate structure of this invention having five layers was formed with a chill roll temperature of 65° F. The first layer was PP (Fina 3622). The second layer was EVA (Exxon LD-761) The third layer was a vinylidene chloride methyl acrylate copolymer (MA Saran). And, the fourth and fifth layers were the same as the second and first layers, respectively This structure can be represented as: Fina 3622/Exxon LD-761/MA Saran/Exxon LD-761/Fina 3622. The adhesion between the layers was tested after four (4) weeks aging. The results are provided in Table 1.

Example 4—Comparison

The multilayer film coextrudate structure of Example 3 was formed with a chill roll temperature of 160° F. This structure is not according to the present invention. The adhesion between the layers was tested after four (4) weeks aging. The results are provided in Table 1.

TABLE 1

| Example | Results of Testing | |
|---|---|---|
| | 4-Week Aged Adhesion (gms.) | Post-Retort Adhesion (gms.) |
| 1 | 807 | 272 |
| 2 | 874 | 600 |
| 3 | 1115 | ND |
| 4 (comparison) | 323 | ND |

ND = Not determined

The results from testing the structures of Examples 1 and 2 demonstrate the superior adhesion of and thus the superiority and benefits of multilayer film coextrudate structures of this invention. The results from testing the structures of Examples 3 and 4 (comparison) demonstrate the superior adhesion of and thus the superiority and benefits of multilayer film coextrudate structures processed with a chill roll having a reduced temperature in accordance with this invention. In particular, with respect to Examples 1 and 2, the Post-Retort Adhesion data clearly shows that the multilayer film coextrudate structures of this invention are particularly suited for film-packages which are to be subjected to retorting or like conditions.

We claim:

1. A film comprising a plurality of superimposed coextruded layers; said layers comprising a first layer and a second layer; said first layer containing 10 to 30% by weight of the composition of the second layer; and, said second layer containing 10 to 30% by weight of the composition of the first layer, wherein the first layer comprises 90 to 70% by weight polyolefin and 10 to 30% by weight vinylidene chloride copolymer; and, the second layer comprises 10 to 30% by weight polyolefin and 90 to 70% by weight vinylidene chloride copolymer.

2. The film of claim 1 wherein said first layer comprises 10 to 30% by weight ethylene vinyl acetate and 90 to 70% vinylidene chloride methyl acrylate copolymer and said second layer comprises 10 to 30% by weight vinylidene chloride methyl acrylate copolymer and 90 to 70% ethylene vinyl acetate.

3. A method for adhering a first layer to a second layer in a film comprising a plurality of superimposed layers, said method comprising adjusting the composition of said first layer so that it contains 10 to 30% by weight of the composition of the second layer, adjusting the composition of said second layer so that it contains 10 to 30% by weight of the composition of the first layer, and coextruding the said adjusted composition of the first layer and the said adjusted composition of the second layer to form the said film comprising a plurality of superimposed layers, wherein the adjusted composition of the first layer comprises 90 to 70% by weight polyolefin and 10 to 30% by weight vinylidene chloride copolymer and the adjusted composition of the second layer comprises 10 to 30% by weight polyolefin and 90 to 70% by weight vinylidene chloride copolymer.

4. The method of claim 1 wherein in the coextruding step, there is a chill roll having a temperature of from about 40° to about 70° F.

5. The method of claim 1 wherein in the coextruding step, there is a chill roll having a temperature of less than about 40° F.

6. The method of any one of claims 3, 4 or 5 wherein the vinylidene chloride copolymer comprises vinylidene chloride methyl acrylate copolymer.

* * * * *